United States Patent [19]

Liu et al.

[11] 4,444,852

[45] Apr. 24, 1984

[54] SIZE AND WEIGHT GRADED MULTI-PLY LAMINAR ELECTRODES

[75] Inventors: Chia-Tsun Liu, Monroeville; Brian G. Demczyk, Rostrover Township, Westmoreland County; Irvin R. Rittko, Murrysville Borough, all of Pa.

[73] Assignee: The United States of America as represented by the United States Department of Energy, Washington, D.C.

[21] Appl. No.: 442,706

[22] Filed: Nov. 18, 1982

Related U.S. Application Data

[63] Continuation-in-part of Ser. No. 412,369, Aug. 27, 1982.

[51] Int. Cl.³ .............................................. H01M 4/00
[52] U.S. Cl. ...................................... 429/29; 429/42; 429/46
[58] Field of Search .................... 429/29, 27, 28, 40, 429/42, 46

[56] References Cited

U.S. PATENT DOCUMENTS

| | | | |
|---|---|---|---|
| 3,423,247 | 1/1969 | Darland, Jr. et al. | 136/120 |
| 3,977,901 | 8/1976 | Buzzelli | 136/86 A |
| 4,152,489 | 5/1979 | Chottiner | 429/27 |
| 4,341,848 | 7/1982 | Liu et al. | 429/27 |

Primary Examiner—Charles F. LeFevour
Attorney, Agent, or Firm—D. P. Cillo

[57] ABSTRACT

An electrode is made comprising a porous backing sheet, and attached thereto a catalytically active layer having an electrolyte permeable side and a backing layer contacting side, where the active layer comprises a homogeneous mixture of active hydrophobic and hydrophilic agglomerates with catalyst disposed equally throughout the active layer, and where the agglomerate size increases from the electrolyte permeable side to the backing sheet contacting side.

13 Claims, 4 Drawing Figures

SIZE AND WEIGHT GRADED MULTI-PLY LAMINAR ELECTRODES

GOVERNMENT CONTRACT

This invention was made or conceived in the course of or under Contract No. EY-76-C-02-2949, with the U.S. Government as represented by the Department of Energy.

CROSS-REFERENCE TO RELATED APPLICATIONS

The present application is a continuation-in-part application of application U.S. Ser. No. 412,369, filed on Aug. 27, 1982, and assigned to the assignee of this invention.

BACKGROUND OF THE INVENTION

Bifunctional air electrodes for metal-air batteries, such as iron-air batteries, generally consist of three components. These components are a hydrophobic layer which permits air passage while retaining electrolyte, and a dual component active layer attached thereto containing a catalytic active paste material, and a plurality of porous fiber metal current collectors in which the active paste is contained, as taught by Chottiner et al., in U.S. Pat. No. 4,152,489.

The active paste material usually comprises an oxygen absorption/reduction carbon having a BET total surface area of from 30 to 1,500 square meters per gram, a suitable catalyst, an oxygen evolution metal additive, such as $WS_2$ or WC coated with 1 to 20 weight percent Co, and a dispersion of polytetrafluoroethylene as a bonding/nonwetting material, as taught by Chottiner et al., in U.S. Pat. No. 4,152,489, and Buzzelli, in U.S. Pat. No. 3,977,901. The active paste consists of the above admixture, mixed with deionized water, with no particular size or weight grading involved throughout the thickness of the active layer.

For good cell performance, the electrolyte must penetrate into the electrode sufficiently to reach the interior surfaces and contact air or other gas in the presence of catalyst. The electrode must at the same time be sufficiently electrolyte-repellant to prevent electrolyte flooding of the electrode pores. Electrolyte flooding has always been a problem with air electrodes, and while the Chottiner et al. structure, and the Buzzelli active paste composition solved the problem to an acceptable degree, providing stable electrical characteristics for about 100 cycles, even more improved structures or compositions would be highly desirable, especially if electrolyte flooding could be completely eliminated.

Darland, Jr. et al., in U.S. Pat. No. 3,423,247, attempted to solve electrolyte flooding of gas electrodes in fuel cells by providing two zones in the electrode structure. One zone, next to the gas supply, consists of low surface area, large particles having high wetproofing and no catalyst, containing from 30 to 70 volume percent polytetrafluoroethylene. The other zone, next to the electrolyte, consists of high surface area, small, catalyzed particles operating in wetted condition. A single mesh current collector is attached to the zone next to the gas supply. Such a configuration is still not completely effective, however, and a need still exists for a maximum output, minimal flooding electrode for use in metal-air batteries and fuel cells.

SUMMARY OF THE INVENTION

The above problems have been solved and the above needs met by utilizing at least two bonded, catalytically active material sections in the electrode active layer, each comprising active material preferably bonded to and at least partially impregnating a supporting porous metal current collector; where each active material section is equally electrochemically active, and contains catalyst and a mixture of hydrophobic agglomerates and hydrophilic agglomerates. Both the hydrophobic and hydrophilic agglomerate particle size increases from the electrolyte side to the air side of the electrode, while the weight percent of hydrophobic agglomerates in the active layer increases from the electrolyte side to the air side. The active layer is attached to a porous hydrophobic backing sheet prior to use as an air electrode.

The initial, catalytically active material comprises: an oxygen absorption/reduction carbon, preferably having a BET total surface area of from about 30 to about 300 square meters per gram; a suitable catalyst such as silver, preferably precipitate coated on the carbon particles; preferably, a low oxygen over-voltage metal additive, such as NiS or $FeWO_4$; and a fluorocarbon particle dispersion, as a bonding/nonwetting material where the dispersion agent is a heat decomposible organic material that is effective to reduce surface tension between the fluorocarbon particles, such as an anionic surfactant, or preferably a non-ionic surfactant.

Initially, all the active material is hydrophilic, but a portion of it is best treated to thermally decompose the dispersion agent for the fluorocarbon, to provide a hydrophobic material which will retain electrolyte, because the dispersion agent is not present to reduce surface tension and allow good capillary flow of the electrolyte. The usual weight percent ratio of active hydrophilic material:active hydrophobic material in the active layer is about 40%:60%. The weight ratio of active hydrophilic material:active hydrophobic material through the thickness of the active layer of the electrode can range from about 1:0.2 at the electrolyte contact surface to about 1:5 at the air contact surface. By utilizing this configuration, catalyst is disposed throughout the active layer, the hydrophobic and hydrophilic regions are matched, and three phase interfacial contact of electrolyte, air and catalyst is maximized throughout the active layer thickness. It is to be understood throughout that the term "air" includes oxygen. In metal-air batteries, current is collected from all the supporting metal current collectors simultaneously. Dramatically, stable electrical characteristics are achieved for up to about 300 cycles without electrode flooding or delamination due to trapped gases. Such electrodes are useful in a variety of metal-air batteries and fuel cells.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
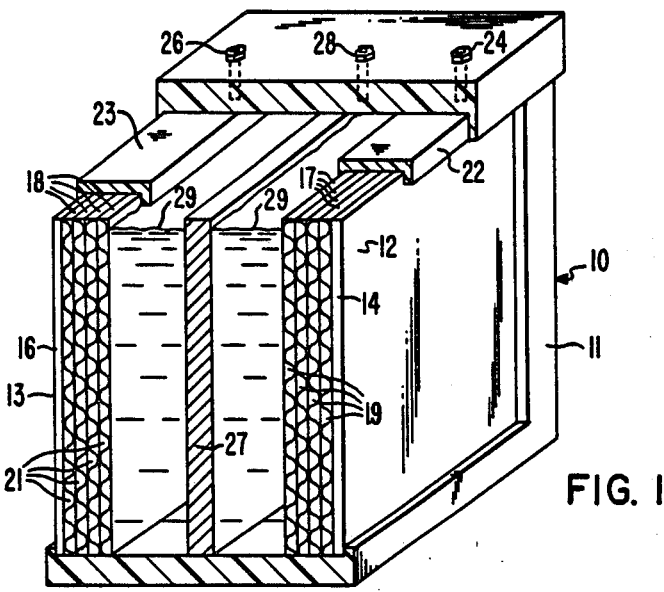
FIG. 1 is an isometric view, in partial section, of one type of an air/metal battery, utilizing the electrode of the present invention.

Referring now to FIG. 1, the battery 10 shown is a general representation of metal/air cells of the present invention employing bifunctional air electrodes. Metal/air cell 10 includes a casing 11 for support of the air electrode and metal electrode as well as the electrolyte. Preferably, casing 11 is fabricated from ABS plastic or other non-conducting material that is stable or resistant to the electrolyte and reaction products, typically oxygen and hydrogen. Cell 10 comprises a pair of air electrodes 12 and 13 each having an outer hydrophobic sheet 14 and 16, respectively, each of which may be in contact with the atmosphere or other source of air or oxygen. Air electrodes 12 and 13 also include a plurality of active material sections 17 and 18, respectively, each active material section consisting of active material bonded to and contained in porous metallic plaques. These sections include integral metal current collectors 19 and 21. The plurality of active material sections make up the active layer. Electrodes 12 and 13 are framed in frames 22 and 23, preferably made from ABS plastic, and having electrical leads 24 and 26, respectively.

Metal/air cell 10 includes a metal electrode 27, fabricated from iron, cadmium, zinc or the like material, preferably iron, spaced between air electrodes 12 and 13 and including electrical lead 28. Metal/air cell 10 also includes an electrolyte 29 between and in contact with metal electrode 27 and air electrodes 12 and 13, respectively. Electrolyte 29 comprises an alkali hydroxide, preferably potassium hydroxide.

Figure 2:
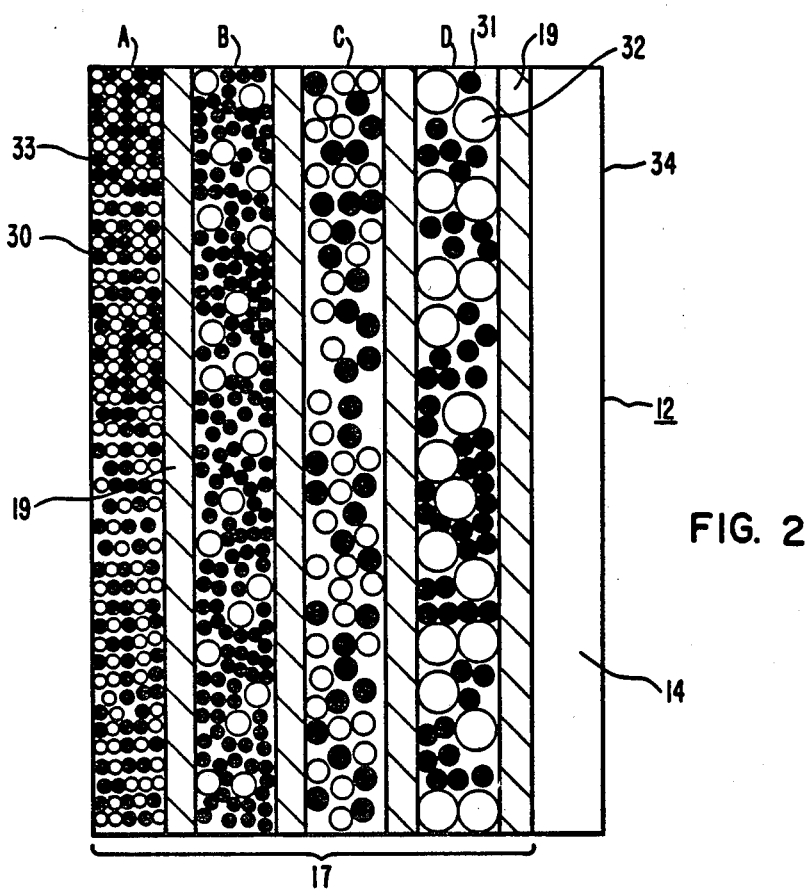
FIG. 2 is an enlarged sectional view of one embodiment of the electrode of the present invention, showing the particle size gradient of the hydrophilic and hydrophobic material through the active layer.

FIG. 2 shows in detail the electrode 12 of FIG. 1. As can be seen, the electrode is of a laminar construction. Cathode 12 is shown with a plurality of active material sections 17, making up the active layer, and a porous hydrophobic backing sheet 14 laminated thereto. Current collectors 19 used in metal-air battery applications are shown in the active layer 17 and are adapted for electrical connection to the circuit. In the preferred embodiment, at least two current collectors are used. The active material 30, comprises both hydrophilic agglomerates 31 and hydrophobic agglomerates 32 which coat, and bond to, and at least partially impregnate the current collectors 19, although such impregnation is not shown for sake of simplicity.

The current collector 19 can be made of expanded metal, such as nickel. It can also be made from expanded nickel coated iron or steel. Preferably it is made from nickel coated iron or steel fiber metal, or uncoated nickel, iron or steel fiber metal, for example, nickel or steel wool. Most preferably the metal fibers are diffusion bonded together and exceed 1.5 inches in length. Fiber diameters are usually from about 0.0002 inch to about 0.005 inch. Diffusion bonding techniques are well known, and described in detail in U.S. Pat. No. 4,152,489. The current collector plaque 19 should have a porosity of about 75% to about 95% and a thickness of between about 0.005 inch to about 0.050 inch. For fuel cell electrode applications, current collectors can be excluded.

In the present invention the active layer 17 is about 0.010 inch to about 0.150 inch thick for metal-air battery applications and about 0.005 inch to about 0.030 inch thick for fuel cell applications. The porous hydrophobic backing sheet 14 is about 0.005 inch to about 0.020 inch thick for metal-air battery applications and about 0.002 inch to about 0.020 inch thick for fuel cell application. The porous backing sheet 14 can comprise a porous pressed layer or sheet of particulate polytetrafluoroethylene or milled, fibrillated polytetrafluoroethylene fibers alone, or with either or a combination of unfibrillated fluorinated ethylene propylene fibers, carbon particles or fibers, polypropylene, polyethylene, and the like, as is well known in the art.

The plurality of active material sections constituting active layer 17, after their formation, for example, by individual cold pressing, which is particularly applicable for metal-air battery use, can be hot press or roll laminated together to form a consolidated laminar structure. The consolidated active layer 17 and the hydrophobic sheet 14 can then be press or roll laminated together at from about 190° C. to about 350° C., with an air pressure of from about 25 psi. to about 750 psi. Alternatively, the porous backing sheet can be attached during the active layer lamination process.

As can be seen from FIG. 2, the catalytically active material 30, constituting the active layer, comprises a mixture of both catalytically active hydrophobic and catalytically active hydrophilic material, both of whose agglomerates increase in particle size diameter from the electrolyte contact side 33 to the air contact side 34 of the electrode. Additionally, the weight percent of hydrophobic material in the active layer 17 increases from the electrolyte side 33 to the air side 34. The weight percent ratio of (active hydrophilic material):(active hydrophobic material) in the active layer 17 is about (30% to 50%):(50% to 70%), usually about 40%:60%. The weight ratio of (active hydrophilic material):(active hydrophobic material) through the thickness of the active layer 17 can range from about (1):(0.2) at the electrolyte contact side 33 to about (1):(5) at the air contact side, i.e., the porous backing sheet contact side.

For example, active material section A may contain 1.5 parts of hydrophilic material having a particle size of about 800 microns and 0.5 part of hydrophobic material having a particle size of about 650 microns. Section B may contain 1.5 parts of hydrophilic material having a particle size of about 800 microns and 1.5 parts of hydrophobic material having a particle size of about 650 microns. Section C may contain 1.0 part of hydrophilic material having a particle size of about 1,000 microns and 2.0 parts of hydrophobic material having a particle size of about 700 microns. Section D may contain 0.5 part of hydrophilic material having a particle size of about 1,100 microns and 2.5 parts of hydrophobic material having a particle size of about 1,100 microns. Thus, the particle size of hydrophilic material increases from side 33 to side 34, i.e., from 800 to 1,100 microns, and the particle size of hydrophobic material also increases from side 33 to side 34, i.e., from 650 to 1,100 microns; and the weight ratio of (hydrophilic material):(hydrophobic material) increased from side 33 to side 34, i.e., from (1):(0.3) to (1):(5).

It is critical to the invention that the active layer be electrochemically active throughout, that the active material comprise both hydrophilic material and hydrophobic material in a homogenous admixed combination in each active section, and that there be both an agglomerate particle size gradient and a weight ratio gradient from the electrolyte contact side to the air contact side through the active layer of the electrode structure. This concept dramatically reduces electrolyte flooding problems after extended cycling, providing an almost ideal three phase interface between electrolyte, air or oxygen, and catalyst contained throughout the active material. The term "hydrophilic material" means agglomerates through which electrolyte can readily permeate and flow. The term "hydrophobic material" means agglomerates which tend to retain electrolyte or prevent its flow, yet which easily pass air. Importantly, catalyst is equally distributed throughout the active layer, even in section D, next to the porous backing layer 14; and bonding/nonwetting material is equally distributed throughout the active layer, even in section A next to the electrolyte contact surface 33, as described hereinafter.

The catalytically active material, 30 in FIG. 2, contained in each active material section A, B, C and D, comprises: an oxygen absorption/reduction carbon, preferably having a BET total surface area of from about 30 square meters per gram to about 300 square meters per gram; a suitable catalyst, such as silver preferably coated or otherwise contained on or in the carbon particles; preferably, a low oxygen overvoltage metal additive such as $CoWO_4$, $WS_2$, nickel spinels, and preferably NiS, $FeWO_4$, WC, WC coated with 1 to 20 weight percent Co, and their mixtures; and a fluorocarbon particle dispersion, preferably a polytetrafluoroethylene dispersion, as a bonding/nonwetting material, where the dispersion agent is a heat vaporizable or decomposable organic material that is effective to reduce surface tension between the fluorocarbon and other particles and promote electrolyte capillary flow between particles in the active material. Useful dispersion agents include anionic surfactants, such as sodium alkaryl polyether sulfonate, sodium alkaryl polyether sulfate, sodium alkaryl ether sulfate, dioctyl sodium sulfosuccinate, and phosphate esters in acid form, and the like, and their mixtures; and preferably non-ionic surfactants, such as octyl phenol ether alcohol, octyl phenol polyether alcohol, nonyl phenol polyether alcohol, alkylpolyether alcohol, alkylaryl polyethylene glycol ether, and the like, and their mixtures, and mixtures with anionic surfactants, as are well known in the art. Cationic surfactants, having a negative charge, tend to repel electrolyte penetration and are not particularly useful.

The useful carbon in this invention is preferably in a fluffy form comprising discrete particles in a chain-like form, such as acetylene black. If in a pressed pellet form, it can be ground to a useful particle size. Acetylene black has a low resistivity of from about 0.035 to 0.22 ohms/cubic inch at 2,500 psi, making it an excellent electron conductor. It has a bulk density of about 1.20 lb./cubic foot, a particle size of from about 0.005 to 0.13 micron, and each particle contains few pore openings greater than 0.002 micron on its external surface. Almost all of its surface area is external, there being few internal channels. Certain channel carbon black materials are also useful. The preferred BET total surface area range for the carbon is from about 30 to about 300 square meters per gram.

As a bifunctional air electrode in a metal-air battery, the carbon acts as a surface to evolve oxygen during electrode charging. The carbon also usually serves as a surface for the silver, nickel, platinum or other suitable catalyst, depending on electrode application, which can be applied to the carbon. In one method of applying silver, the preferred catalyst for metal-air battery applications, carbon is mixed with $AgNO_3$ solution and the silver precipitated out and onto the carbon with hydrazine. A further more complete description of various carbons, the BET (Brunauer, Emmett and Teller) method of measuring surface area, and various low oxygen overvoltage metal additives, can be found in U.S. Pat. No. 3,977,901, herein incorporated by reference.

Very importantly, after admixing all the component ingredients, all of the hereinbefore described catalytically active material is air dried at from about 25° C. to 30° C. for 12 to 48 hours, providing an active all hydrophilic material. Then a portion of this hydrophilic material is heat treated by oven baking at from about 250° C. to 325° C. for about 1 to 3 hours in air or a flowing gas atmosphere. This heat treatment causes the dispersion agent for the fluorocarbon to thermally decompose or vaporize to provide a hydrophobic material which will retain electrolyte because the dispersion agent, usually a surfactant, is not present to reduce surface tension and allow good capillary flow of the electrolyte.

The air dried portion and the heat treated portion are size graded to provide agglomerates or particle masses ranging from about 150 microns to about 2,000 microns, for metal-air battery applications, and from about 30 microns to about 300 microns for fuel cell applications. They are then admixed in the appropriate amounts to provide the weight range gradient described hereinbefore. By the term "agglomerates" is meant a combined mass comprising a plurality of the extremely fine carbon particles together with the coarser fluorocarbon and the metal addive particles which are particularly useful in metal-air battery applications. These range in particle size from about 0.5 to 50 microns for the former, and about 50 to 200 microns for the latter.

For both the hydrophilic and hydrophobic materials, the amount of fluorocarbon bonding/nonwetting solids may vary from about 10 weight percent to about 50 weight percent of the total composition. Usually the fluorocarbon dispersion contains from 50% to 60% fluorocarbon solids, and 5% to 10% dispersing agent, with the rest of the dispersion as water. Low oxygen overvoltage material can be added in the amount of from about 0.25 part to about 5 parts/part carbon. These materials may act as pore formers and in some instances prevent catalyst dissolution. The carbon will generally contain from about 2 weight percent to about 10 weight percent, preferably from about 2 to about 5 weight percent silver or other suitable catalyst.

These electrodes are particularly useful in electrochemical energy cells, which can be combined to form metal/air batteries, where the metal electrode can be iron, zinc, cadmium, or aluminum with alkali hydroxide electrolyte disposed between and contacting the electrodes.

These electrodes can also find use as electrodes in a variety of fuel cells, such as room temperature alkaline fuel cells and high temperature phosphoric acid fuel cells, both of which are well known in the art. There, a fuel electrode contacts a fuel, such as hydrogen gas and an air electrode contacts air or oxygen, and electrolyte contacts the fuel electrode and the air electrode. In such applications, the electrode of this invention can be used as either the fuel electrode or the air electrode, and the electrolyte, such as potassium hydroxide or phosphoric acid, is disposed between the fuel and air electrodes. Reference may be made to U.S. Pat. No. 3,935,029, herein incorporated by reference, for a complete description of fuel cell operation and standard electrode construction.

EXAMPLE 1

A 4.5 inch×4.5 inch air electrode was made. Dry acetylene carbon black particles, having a BET surface area of from about 60 to 70 square meters per gram (sold commercially by Shawinigan Products Corp. under the tradename Shawinigan Black) were mixed with $AgNO_3$ in a wet slurry. Hydrazine was then added to precipitate the silver on the carbon particles. Excess water was then vacuumed off and the paste allowed to air dry for 24 hours. Sufficient $AgNO_3$ solution was used to provide a 3 to 4 weight percent silver content on the surface of the carbon particles. To 30 grams of this silverized carbon powder was added 4.5 grams of NiS; 4.5 grams of $FeWO_4$; 4.5 grams of WC coated with 12 weight percent Co; 12 grams of aqueous polytetrafluoroethylene dispersion containing 7.2 grams of polytetraethylene solids and about 1.0 gram of an octylphenol polyether alcohol nonionic surfactant dispersing agent; and 170 ml. of water, to form a slurry. The slurry was then air dried on a screen at 25° C. for 24 hours to provide an active hydrophilic material.

The mixture of low oxygen overvoltage materials was present in an amount of about 0.45 part/part carbon, and the polytetraethylene solids constituted about 14 weight percent of the air dried, catalyzed material. About 60 weight percent of the air dried, catalyzed material was placed in an oven and baked at 300° C. for 2 hours, to vaporize and decompose the nonionic surfactant and provide a heat treated active hydrophobic material. Without the surfactant, this material would provide little capillary penetration of electrolyte. Both the active hydrophilic material and the active hydrophobic material had the same amount of catalyst and polytetrafluoroethylene product, and both were sieved and size graded to provide batches of hydrophilic agglomerates having particle sizes of 793 microns and 1,098 microns, and batches of hydrophobic agglomerates having particle sizes of 660 microns, 793 microns, and 1,098 microns.

Four 4.5 inch×4.5 inch×0.01 inch thick diffusion bonded, 94% porous, nickel fiber wool plaques were used as the current collectors, to provide an air electrode structure similar to that shown in FIG. 2 of the drawings. All plaques were welded along their upper edge to an electrical lead tab. The catalytically active material sections were laid down as follows, where HL=active hydrophilic material and HP=active hydrophobic material:

| | |
|---|---|
| A - next to electrolyte | 1.2 g. HL at 793 micron + |
| | 0.8 g. HP at 660 micron |
| | NICKEL FIBER PLAQUE |
| B - next to A | 1.2 g. HL at 793 micron + |
| | 1.8 g. HP at 660 micron |
| | NICKEL FIBER PLAQUE |
| C - next to D | 1.0 g. HL at 1,098 micron + |
| | 1.5 g. HP at 660 micron + |
| | 0.5 g. HP at 793 micron |
| | NICKEL FIBER PLAQUE |
| D - next to air contact | 0.8 g. HL at 1,098 micron + |
| | 0.5 g. HP at 1,098 micron + |
| | 1.7 g. HP at 793 micron |
| | NICKEL FIBER PLAQUE |

Each section of catalyzed active material was cold pressed into its corresponding nickel plaque at 2,500 lb./sq. inch, to provide a coating on and at least partial impregnation of the corresponding plaque.

At this point a hydrophobic sheet was made by mixing carbon black particles and polytetrafluoroethylene in a mill, to fibrillate the polytetrafluoroethylene, and then cold pressing the milled admixture at 2,500 lb./sq. inch into a sheet form. The hydrophobic sheet was then placed on the platen of a hot bed press and sections D, C, B and A respectively superimposed thereon to provide an electrode stack up. The entire stack up was then heat and pressure consolidated in the hot bed press at 4,000 lb./sq. inch and 300° C., to provide a unitary air electrode similar in structure to that shown in FIG. 2.

The active layer of the air electrode consisted of 38 weight % hydrophilic material and 62 weight % hydrophobic material excluding plaque weight, and the weight ratio of active hydrophilic material:active hydrophobic material ranged from 1.2:0.8 or 1:0.67 for the section next to electrolyte, to 0.8:(0.5±1.7) or 1:2.5 for the section next to the hydrophobic sheet on the air side. Also, the particle size of the hydrophilic material increased from 793 to 1,098 microns and the particle size of the hydrophobic material increased from 660 to 1,098 microns from the electrolyte to the air side.

The consolidated air electrode, containing 4 active material sections and 4 current collectors was used as one side of a square plastic container filled with a 25 wt.% KOH electrolyte solution, where the hydrophobic sheet contacted an air source and section A of the air electrode contacted the electrolyte. The plastic framed the air electrode, similarly as shown in FIG. 1 of the drawings, so that the active surface was reduced to about 3¼ inch×3¾ inch. A flat nickel sheet formed the opposite wall of the cell acting as a counter electrode. A polytetrafluoroethylene sheet was used to cover the side of the nickel counter electrode not in contact with electrolyte. A Hg/HgO reference electrode was inserted into the electrolyte between the nickel sheet and the air electrode, and suitable electrical connections were made. This electrical cell, using the air electrode of this invention, was then cycled for 250 cycles, where 1 cycle=4 hours discharge at 25 mA/sq. cm.+4 hours charge at 12.5 mA/sq. cm.

Figure 3:
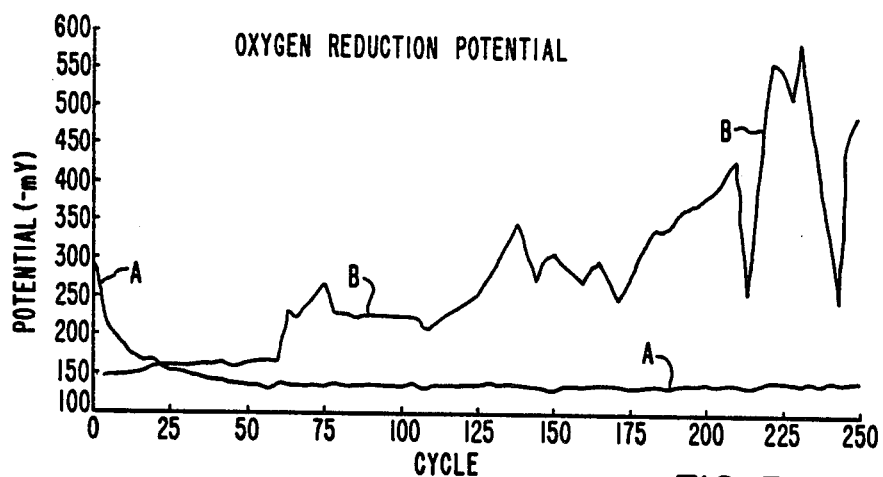
FIG. 3 is a comparative graph showing oxygen reduction potential vs. cycle number.
Figure 4:
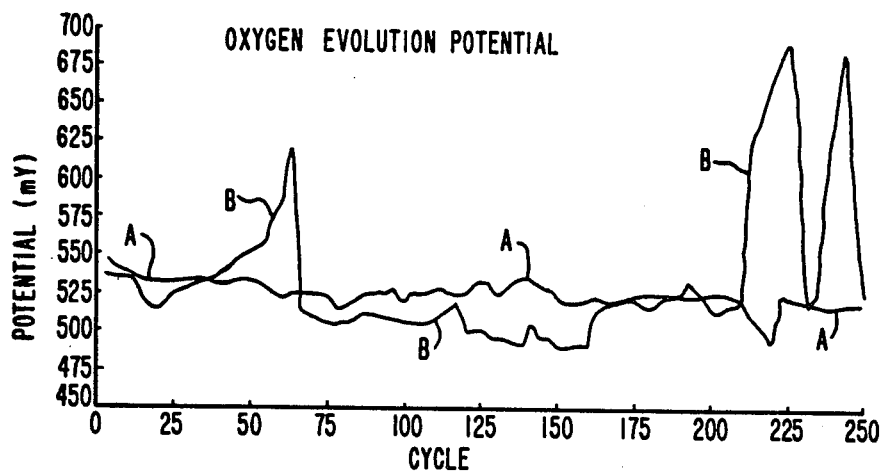
FIG. 4 is a comparative graph showing oxygen evolution potential vs. cycle number.

A graph of oxygen reduction potential vs. cycle, FIG. 3, and oxygen evolution potential vs. cycle, FIG. 4, was made, where curve A in each graph represents the cell performance using the air electrode of this invention. As can be seen, the air electrode of this invention, having both a size and weight grading across its active layer, exhibited stable electrical characteristics, with no major potential changes, indicating no uncontrolled electrolyte flooding of any active regions and no structural delaminations in any active regions due to oxygen entrapment. Testing was continued and the curve remained stable up to 300 cycles. Such dramatic results indicate the superiority of the air electrode of this invention, and indicate its usefulness in a non-flooding metal-air battery. A comparative material represented by curve B in each graph is described in Example 2 below.

COMPARATIVE EXAMPLE 2

For purposes of comparison, a 4.5 inch×4.5 inch air electrode was made utilizing four 4.5 inch×4.5 inch×0.01 inch thick diffusion bonded, 94% porous, nickel fiber wool plaques as current collectors. The ingredients and amounts for the active material were the same as used in Example 1, so that the mixture of low oxygen overvoltage materials was present in an amount of about 0.45 part/part carbon, and the polytetraethylene solids constituted about 14 weight percent of the air dried, catalyzed material. A small percent of the air dried, catalyzed material was baked, as described in Example 1, to provide a hydrophobic material. Both the active hydrophilic material and the active hydrophobic material had the same amount of catalyst and polytetrafluoroethylene present, and both were sieved and size graded to provide hydrophilic and hydrophobic agglomerates, both having particle sizes of approximately 2,500 microns.

The catalytically active material sections were laid down as follows, where HL=active hydrophilic material and HP=active hydrophobic material:

| | |
|---|---|
| A - next to electrolyte | 1.5 g. HL at approximately 2,500 microns |
| | NICKEL FIBER PLAQUE |
| B - next to A | 1.5 g. HL at approximately 2,500 microns |
| | NICKEL FIBER PLAQUE |
| C - next to D | 1.5 g. HL at approximately 2,500 microns |
| | NICKEL FIBER PLAQUE |
| D - next to air contact | 1.5 g. HL at approximately 2,500 microns + 0.4 g. HP at approximately 2,500 microns |
| | NICKEL FIBER PLAQUE |

Thus, unlike Example 1, there was neither a homogeneous mixture of hydrophilic and hydrophobic agglomerates through the active layer, nor a particle or weight gradient through the active layer.

As in Example 1, each section of catalyzed active material was cold pressed into its corresponding nickel plaque, and a stack up prepared and hot bed pressed to a hydrophobic sheet to provide a unitary air electrode containing 4 active material sections and 4 current collectors. This comparative air electrode was then used as the air electrode of an electrical cell, as described in Example 1 and then cycled for 250 cycles, where 1 cycle=4 hours discharge at 25 mA/sq. cm.+4 hours charge at 12.5 mA/sq.cm.

A graph of oxygen reduction potential and oxygen evolution potential vs. cycle was made, FIG. 3 and FIG. 4 respectively, where curve B in each graph represents the cell performance using this comparative air electrode. As can be seen, curve B in both graphs shows major potential changes and a lack of stability through the 250 cycles.

As described hereinabove, the size and weight graded, multi-ply laminar electrodes of this invention can also be used in fuel cell applications.

We claim:

1. An electrode comprising:
   (a) a porous backing sheet; and
   (b) a catalytically active layer attached to said porous backing sheet having an electrolyte permeable side and a backing sheet contacting side, said catalytically active layer comprising catalyst and a mixture of hydrophobic agglomerates and hydrophilic agglomerates; wherein the particle size of the hydrophobic agglomerates and the hydrophilic agglomerates increases from the electrolyte permeable side to the backing sheet contacting side, and the weight percent of hydrophobic agglomerates increases from the electrolyte permeable side to the backing sheet contacting side.

2. The electrode of claim 1, where the hydrophobic agglomerates comprise carbon particles, and fluorocarbon material; the hydrophilic agglomerates comprise carbon particles, fluorocarbon material, and an organic dispersion agent that is effective to reduce liquid surface tension between the hydrophilic agglomerates; and the catalyst is disposed equally throughout the active layer.

3. A fuel cell, comprising a fuel electrode, an electrode as set forth in claim 1 spaced apart from said fuel electrode, and an electrolyte in contact with said electrodes.

4. A metal/air cell, comprising a metal electrode, at least one electrode as set forth in claim 1, acting as an air electrode, spaced apart from said metal electrode, and an alkali hydroxide electrolyte in contact with said metal and air electrode.

5. An air electrode for use in electrochemical energy cells comprising:
   (a) a hydrophobic sheet; and
   (b) a catalytically active layer laminated to said hydrophobic sheet having a highly electrolyte permeable side and a hydrophobic sheet contacting side, said catalytically active layer comprising a homogeneous mixture of active hydrophobic agglomerates and active hydrophilic agglomerates, with at least two porous metallic current collectors disposed therein; said active hydrophobic agglomerates comprising oxygen absorption/reduction carbon particles having a total surface area of from about 30 to about 300 square meters per gram; catalyst; low oxygen overvoltage material; and fluorocarbon bonding/nonwetting material, and said active hydrophilic agglomerates comprising oxygen absorption/reduction carbon particles having a total surface area of from about 30 to about 300 square meters per gram; catalyst; low oxygen overvoltage material; fluorocarbon bonding/nonwetting material; and an organic dispersion agent that is effective to reduce liquid surface tension between the hydrophilic agglomerates; wherein catalyst is disposed equally throughout the active layer, the particle size of the hydrophilic agglomerates and the hydrophilic agglomerates increases from the highly electrolyte permeable side to the hydrophobic sheet contacting side and the weight ratio of active hydrophilic material:active hydrophobic material varies from about 1:0.2 at the highly electrolyte permeable side to about 1:5 at the hydrophobic sheet contacting side.

6. The air electrode of claim 5, where the current collectors in the active layer comprise a metal fiber structure, the catalyst in the active layer is effective for the decomposition of perhydroxides, and the low oxygen overvoltage material in the active layer is selected from the group consisting of $CoWO_4$, $WS_2$, nickel spinels, $NiS$, $FeWO_4$, $WC$, $WC$ coated with 1 wt.% to 20 wt.% Co, and mixtures thereof.

7. The air electrode of claim 5, where the fluorocarbon in the active layer is polytetrafluoroethylene and the catalyst in the active layer is silver, said silver being deposited on the carbon particles.

8. The air electrode of claim 5, where the organic dispersion agent is selected from the group consisting of anionic surfactants, non-ionic surfactants, and mixtures thereof.

9. The air electrode of claim 5, where the organic dispersion agent is selected from the group consisting of octyl phenol ether alcohol, octyl phenol polyether alcohol, nonyl phenol polyether alcohol, alkylpolyether alcohol, alkylaryl polyethylene glycol ether, and mixtures thereof.

10. The air electrode of claim 5, where the agglomerates in the active layer have a particle size diameter ranging from about 150 microns to about 2,000 microns.

11. A metal/air cell, comprising a metal electrode, at least one air electrode as set forth in claim 5 spaced apart from said metal electrode, and an alkali hydroxide electrolyte in contact with said metal and air electrode.

12. The metal/air cell of claim 11, where the metal electrode is selected from the group consisting of iron, zinc, cadmium, and aluminum.

13. In a metal/air battery comprising a metal electrode selected from the group consisting of iron, zinc cadmium, and aluminum, at least one air electrode spaced apart from said metal electrode, and an alkali electrolyte in contact with said metal and air electrode, the improvement consisting of the air electrode which comprises:
   (a) a hydrophobic sheet; and
   (b) a catalytically active layer laminated to said hydrophobic sheet having a highly electrolyte permeable side and a hydrophobic sheet contacting side, said catalytically active layer comprising a homogeneous mixture of active hydrophobic agglomerates and active hydrophilic agglomerates, with at least two porous metallic current collectors disposed therein; said active hydrophobic agglomerates comprising oxygen absorption/reduction carbon particles having a total surface area of from about 30 to about 300 square meters per gram; catalyst; low oxygen overvoltage material; and fluorocarbon bonding/nonwetting material, and said active hydrophilic agglomerates comprising oxygen absorption/reduction carbon particles having a total surface area of from about 30 to about 300 square meters per gram; catalyst; low oxygen overvoltage material; fluorocarbon bonding/nonwetting material; and an organic dispersion agent that is effective to reduce liquid surface tension between the hydrophilic agglomerates; wherein catalyst is disposed equally throughout the active layer, the particle size of the hydrophobic agglomerates and the hydrophilic agglomerates increases from the highly electrolyte permeable side to the hydrophobic sheet contacting side and the weight ratio of active hydrophilic material:active hydrophobic material varies from about 1:0.2 at the highly electrolyte permeable side to about 1:5 at the hydrophobic sheet contacting side.

* * * * *